March 15, 1966  R. F. TABER  3,240,065
DIFFERENTIAL PRESSURE TRANSDUCER
Filed July 5, 1961  3 Sheets-Sheet 1

INVENTOR.
RALPH F. TABER
BY
ATTORNEY

March 15, 1966 R. F. TABER 3,240,065
DIFFERENTIAL PRESSURE TRANSDUCER
Filed July 5, 1961 3 Sheets-Sheet 2
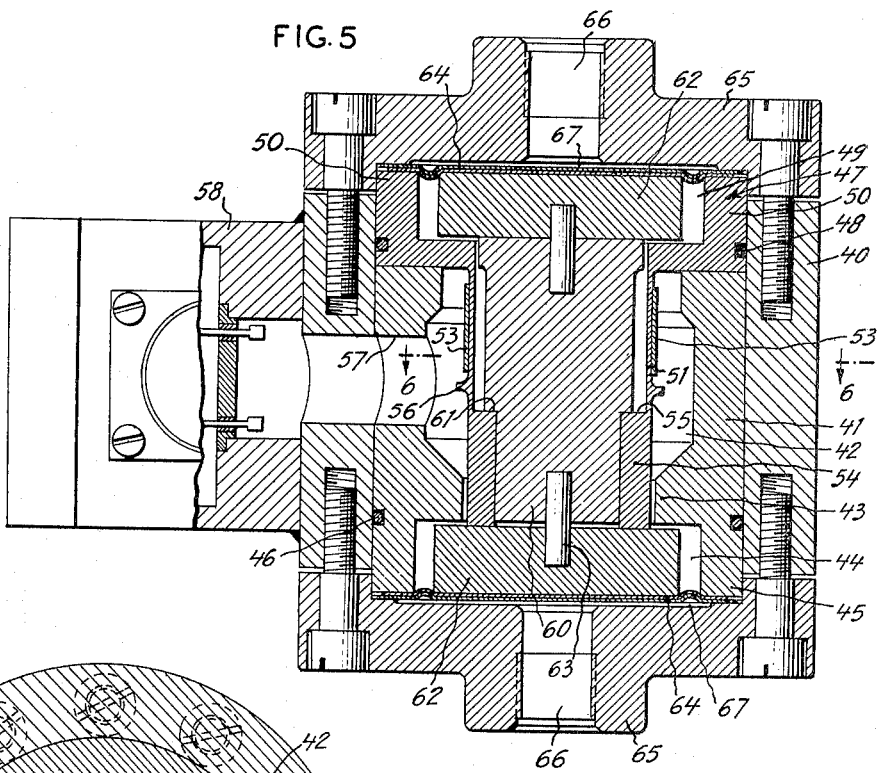
FIG. 5
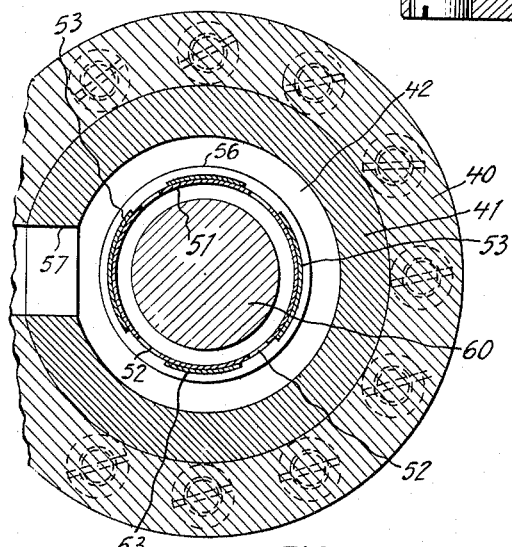
FIG. 6
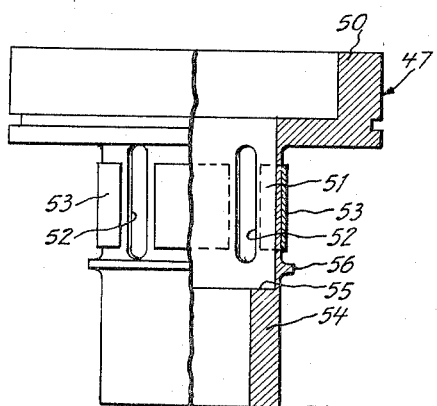
FIG. 7
INVENTOR.
RALPH F. TABER.
BY
ATTORNEY March 15, 1966 R. F. TABER 3,240,065
DIFFERENTIAL PRESSURE TRANSDUCER
Filed July 5, 1961 3 Sheets-Sheet 3

INVENTOR.
RALPH F. TABER
BY
ATTORNEY

United States Patent Office 3,240,065
Patented Mar. 15, 1966

3,240,065
DIFFERENTIAL PRESSURE TRANSDUCER
Ralph F. Taber, North Tonawanda, N.Y., assignor to Taber Instrument Corporation, North Tonawanda, N.Y., a corporation of New York
Filed July 5, 1961, Ser. No. 123,946
11 Claims. (Cl. 73—407)

This invention is an improvement over the invention shown in the application of Roger E. Dumas, Serial Number 631,788, filed December 31, 1956, now Patent Number 3,045,490, issued on July 24, 1962, and is a continuation-in-part of application Serial Number 35,266, filed on June 10, 1960, which application is now abandoned.

This invention relates to improvements in differential pressure transducers.

The invention provides an instrument for measuring or determining variations and differences in pressure between two fluids for obtaining information on the operation of and/or controlling the operation of mechanisms in industrial processes, guided missiles, aircraft, other types of space or land vehicles and other equipment. The instrument has the advantage of providing a construction where parts may be subjected to very high pressures while the force responsive means may be operated at relatively low pressures in order to be highly sensitive to small pressure differences between two fluids for measuring these differences in pressure and using the measurements for indicating, recording or controlling operations in connection with the equipment in which the invention is used. The invention is well suited for use with corrosive fluids and rapid over pressure surges several times the rated pressure without damage to the instrument.

The invention provides a transducer having a pair of force transmitting members or plates mounted on opposite ends of a connecting rod or force transmitting shaft, with a drive connection between one of the plates and the connecting rod and one end of a sensing ring or cylindrical portions, the sensing ring or cylindrical portions having the opposite end secured to a housing for enclosing the plates, connecting rod and sensing ring or cylindrical portions, diaphragms sealing the plates in the ends of the housing and cap members retaining the diaphragms on the housing and providing fluid passages for applying pressure directly to the plates at opposite ends of the housing for measuring the pressure differentials between two fluids whose pressures are applied in opposed relation to the plates. This provides for measurement of pressure differentials of 15 to 50 and 100 pounds per square inch upwards on line pressures varying from 2000 to 5000 pounds per square inch according to the character of sensing element used.

The invention also provides the housing with recesses in opposite ends receiving the plates or discs on the terminals of the shaft or connecting rod and arranged with the end walls in the recesses spaced from the inner marginal portions of the plates a distance of approximately five thousandths of an inch for limiting movement of the plates by differential pressure variations so that the sensing ring or cylindrical sections are protected against injury from excessive pressure differences.

According to the invention, the housing has a pair of sections formed for assembly with the peripheral portions engaged in opposed relation to fix the distance between opposite end walls to maintain the walls in the recesses at the desired distance from the adjacent portions of the plates. The end walls are constructed to provide a seat with a sealing diaphragm engaged therewith and covering the recesses in the end walls so cap members applied to the end walls will seal the housing against entrance of fluid under pressure being applied through passages in the end caps for measurement. A dual sealing diaphragm formed with an annular bead may be used in which one diaphragm at each end of the body may be hermetically sealed to the end walls of the housing and the other diaphragm of the dual form removably engaged with the outer face of the sealed diaphragm to protect it from the corrosive action of fluids whose pressure is being measured. This provides for changing the removable section of the diaphragm without unsealing the housing.

The invention provides a rugged and reliable instrument for use in commercial manufacturing and similar applications subject to hard use and rough treatment and at the same time being highly sensitive to force variations for accurately registering or recording these variations. The housing of the instrument is constructed of several sections which are assembled and retained in operative sealed relation by the bolts or other securing means for attaching the end caps to some of the housing sections. The housing sections are constructed to bring the force responsive parts of the instrument into accurate relation with one another when assembled and at the same time providing for manufacture of the instrument at a reasonably low cost.

The housing for the instrument may have the force responsive member formed in integral as well as detachable relation with one of the body sections of the housing and also be formed of a ring type construction or of cylindrical form. When a cylindrical form of construction is used the invention provides for fixing the length of the cylindrical force responsive section either by means of a shoulder or rib arranged to engage a complementary shoulder on the force transmitting shaft. This enables the instrument to be made so the parts are arranged to transmit force in a manner to eliminate a zero shift during operation. The position of a connecting pin or shoulder for transmitting force from the force transmitting shaft to the force responsive member may be varied according to the invention so that the assembled instrument will not be subject to zero shift during operation in the range for which the instrument is designed.

The invention provides a transducer having greater sensitivity than previous devices in measuring differences between fluid pressures in conduits operating at high pressures by having the pressure sensing mechanism operating at relatively low pressure so a sensitive registering device may be used in more accurately recording the pressure differentials. Greater sensitivity is obtained by having the fluid recesses in the end caps of a size to allow only a small volume of fluid to pass into the cap for engaging directly against the diaphragms in opposed relation. This provides direct and immediate application of pressure and pressure variations to the plate members and sensing ring without appreciable time lags. The present invention provides a rugged reliable instrument that operates well in commercial installations as compared with other available instruments whose operation is limited essentially to laboratory use.

In the drawing:

FIG. 5 is a vertical transverse section of a differential pressure transducer incorporating the invention and showing a modified form of construction from that shown in FIG. 1, portions being shown in elevation for convenience in illustration.

FIG. 6 is a horizontal cross-section taken on line 6—6 of FIG. 5.

FIG. 7 is a side elevation of the housing section carrying the force responsive member with portions broken away and shown in cross-section for convenience in illustrating the details of construction.

Figure 1:
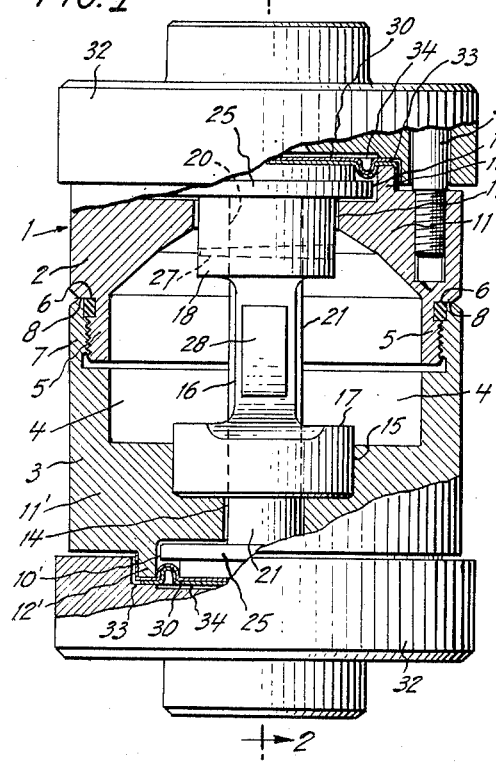
FIG. 1 is a side elevation of a differential pressure transducer incorporating the invention having portions broken away and shown in cross-section to illustrate details of construction.
Figure 2:
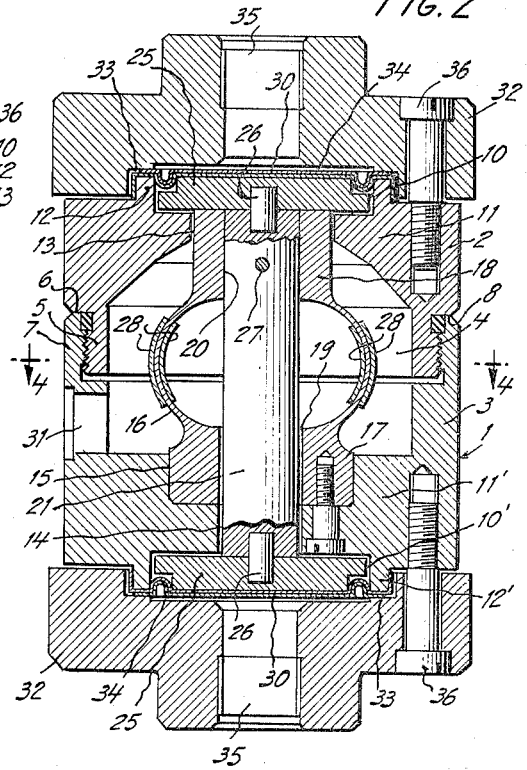
FIG. 2 is a vertical cross-section taken on line 2—2 of FIG. 1.
Figure 3:
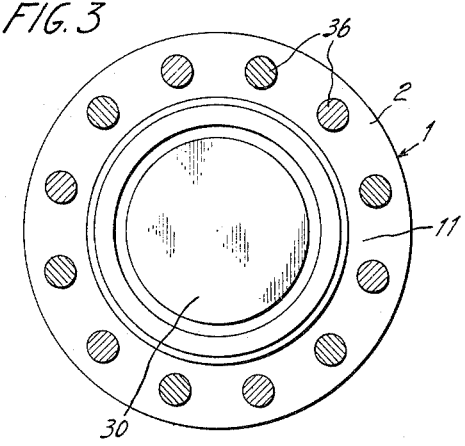
FIG. 3 is a plan view showing one end of the housing with the end cap removed to illustrate the diaphragm.
Figure 4:
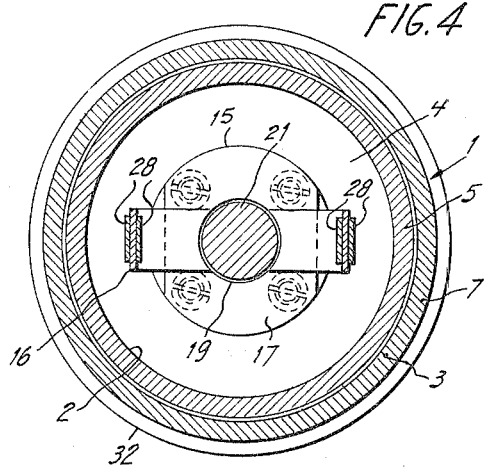
FIG. 4 is a transverse cross-section taken on line 4—4 of FIG. 2.

The transducer provided by the present invention has a housing 1 formed of a pair of sections 2 and 3. Each section is formed with a compartment opening through the inner end, as indicated at 4 cooperating to form a compartment extending between the end walls of the housing. Housing section 2 is formed with a threaded attaching flange 5 and an annular seat 6 at the base of flange 5 on the outer portion thereof. Housing section 3 has an internally threaded attaching flange 7 on the inner end threadedly engaged over the outer portion of flange 5. Section 3 has an annular seat 8 on the inner end of flange 7 aligned with seat 6 for engagement of the annular seats 6 and 8 when the housing sections are assembled, as shown in FIGS. 1 and 2. These annular seats fix the distance between the end walls of the housing for purposes that will be hereinafter described.

Housing section 2 has an outwardly opening annular recess 10 formed in the outer side of end wall 11 and an annular rib 12 projecting outwardly from the end wall and forming a seat portion on the end face thereof about the recess. Housing section 3 has the outer side of end wall 11' formed with an annular recess 10' opening outwardly. An annular rib 12' defines the periphery of the recess, projects outwardly from end wall 11' and has the end formed to provide a seat portion on the free end. The recesses, ribs and seat portions of end walls 11 and 11' are duplicates in size and shape. Housing section 2 has a passage 13 in the central portion extending longitudinally and axially of the housing and opening into recess 10 and compartment 4.

A smaller passage 14 extends between compartment 4 and recess 10' in housing section 3, is arranged in axial and longitudinally extending relation in end wall 11' to passage 13 in end wall 11. End wall 11' is formed with an annual seat portion 15 in the inner portion about recess 14 in aligned longitudinally extending relation therewith and opens inwardly into compartment 4.

A force responsive member or sensing ring 16 has a base portion 17 on one side slidably mounted in end wall 11' in seat portion 15. Screws or other fastening means rigidly secure and fix base portion 17 to end wall 11' with the ring portion located in compartment 4 and head portion 18 extending through passage 13 from the side of the sensing ring opposite to base portion 17. Base portion 17 of force responsive member 16 is formed with an aligned opening 19 of the same size as passage 14 in end wall 11' and axially aligned therewith. Head portion 18 is formed with an opening 20 axially aligned with opening 19 and passage 14 and slightly smaller in size.

A force transmitting shaft or connecting rod 21 has one end portion slidably engaged in opening 20 in head portion 18 with the adjacent extremity in coplanar relation with the extremity of head portion 18, as shown in FIG. 2. The extremities of head portion 18 and connecting rod 21 are located in annular recess 10. The opposite end of connecting rod or force transmitting rod 21 extends in spaced relation through passages 14 and 19 in end wall 11' and base portion 17 with the extremity lying in recess 10'. A pair of force transmitting members or plates 25 are mounted one on each end of shaft 21 with the centers aligned with the center of shaft 21 and the inner faces engaged with the end walls on the extremities of shaft 21. Plate 25 in recess 10 has the inner face also engaged with the end of head portion 18. Pins 26 are provided, one for each end of the shaft with a portion of each pin engaged in axial relation in a bore in the end of shaft 21 and the remaining portion of each pin engaged in a socket in one of the plates 25. Plates 25 may be of annular form to correspond with the shape of recesses 10 and 10', as shown in the drawing. Plates 25 have a size just sligthly smaller than recesses 10 and 10' and substantially completely fill the recesses with the inner flat faces spaced about four to five ten thousandths of an inch (.004–.005 inch), from the adjacent end walls at the bottom of the recesses. The outer faces of plates 25 are flat and lie substantially in the same plane with the seat portions on the ends of annular ribs 12 and 12', respectively. A drive pin or attaching means 27 extends through transverse holes in head portion 18 and connecting rod 21 for rigidly securing these parts together so any force applied to connecting rod 21 is transmitted directly to the sensing ring. Strain gauges 28 of conventional type are mounted on sensing ring 16 in a well known manner and connected to recording, registering and/or controlling apparatus not shown, for recording or registering force variations applied to the sensing ring through shaft 21, drive pin 27 and head portion 18, or using such force variations to control and operate other apparatus.

Sealing diaphragms or flexible barriers 30 are applied across the outer ends of recesses 10 and 10' of the character shown and described in applicant's copending application Serial No. 796,149, filed February 27, 1959, Patent No. 3,024,649, issued March 13, 1962. Dual barriers are used at both ends of the housing. The inner sheets of the barriers have the marginal portions engaging the seat portions on ribs 12 and 12' and hermetically sealed in position about the peripheries of the ribs. Electrical connections to strain gauges 28 and a connection for evacuating the sealed housing are made through opening 31 in the side of the housing. These connections are hermetically secured to the housing to close opening 31 and hermetically seal the compartment for evacuation. Since the flexible barriers are made of metallic foil it is necessary to support them. This is accomplished by having the outer faces of plates 25 support the entire central portion of the barriers with the bead or loop portions formed for support by the marginal flanges on the peripheries of the plate members in case of excessive pressures being applied thereto. Only a very small portion of each barrier extending between the bead portion and the adjacent rib remains unsupported.

Removable outer sheets forming a part of each barrier have the inner surfaces engaging the outer surfaces of the inner sheets with the marginal portions overlying the seat portions on ribs 12 and 12'. The bead portions of the barriers provide for free movement of the force transmitting members due to the free flexing of the bead portions upon movement of the central portions of the diaphragms relative to the marginal portions. The outer sheets of the diaphragms are removable and replaceable without disturbing the hermetic seal of the inner sheets on the housing. This enables replacement of the outer sheets of the barrier when they become corroded without in any way affecting the assembly or adjustment of the strain gauges and force responsive means in the housing.

End caps 32 are each mounted on one end of the housing. Each end cap has the inner face formed with a recess providing a seat portion 33 engaging the marginal portion of barrier 30 for retaining the barrier in sealed relation against the seat portions on ribs 12 or 12′, respectively. Seat portions 33 are in opposed relation to the seat portions on ribs 12 and 12′. Inwardly of the seat portions 33 the end caps are formed with chambers 34. A passage 35 is formed in each end cap 32 and extends from chamber 34 outwardly and opens through the outer side or face of the cap. The outer portion of each end cap may be provided with a threaded portion within the outer end of passage 35 or other suitable means for detachably connecting a conduit to the end cap for conducting fluid whose pressure is to be measured, registered or recorded into chambers 34 for application to force transmitting members 25. End caps 32 are detachably mounted on the housing by means of a plurality of attaching screws 36 extending through apertures in the periphery of each cap into threaded engagement with outer marginal portions of the housing in aligned threaded sockets therein or by other equivalent conventional attaching means. The attaching means or screws 36 secure the end caps to the housing under sufficient compression to carry high pressures of the type for which the instrument is designed, without leakage between the seat portions on the end caps and housing.

The instrument constructed as above described may be made in various sizes in which the drawing illustrates the instrument in full size for operation in measuring pressure differences between two fluids where the pressure may be from two to five thousand pounds per square inch and the variations may run up to approximately one hundred fifty pounds per square inch. The transducer may be made in larger or smaller sizes to operate under similar pressure conditions and may be made to operate under many other line pressures and pressure variations.

The transducer herein described is connected to fluid lines or pipes containing fluid under pressure by having two different fluid pipes or lines connected one to one end cap 32 and the other to the other end cap so that the fluid in the two lines will pass through passages 35 in the respective end caps, into chambers 34 and engage the outer surfaces of the respective barriers. The pressure of the fluid in each line will be directly applied to the force transmitting members 25 on opposite ends of force transmitting shaft 21 in opposed relation. If the pressures in both lines are equal the forces will be equalized between force transmitting members 25 and shaft 21 and no movement of the shaft relative to the housing will occur. If the pressure in one line is greater or smaller than the pressure in the other line, then a relative movement of the members 25 and shaft 21 will take place in a direction toward the end cap having the lower pressure. This movement is transmitted directly to head portion 18 on the sensing ring from the plate member in recess 10 as well as through drive pin 27 to head portion 18 which resists movement out of its normal position of rest. The bending of sensing ring 16 applies stresses to the strain gauges 28 for transmission to the registering or recording apparatus for indicating the difference in the pressure between the two fluids. The instrument is highly sensitive to pressure variations due to the small volume of chambers 34 in end caps 32 causing pressure variations to be immediately applied to members 25.

The present invention has the advantage of being operable in lines having high pressures of the order of two thousand to five thousand pounds per square inch. These pressures are applied to opposite ends of shaft 21 and deflect the sensing ring 16 proportionately to the variations between the pressure at opposite ends of shaft 21. The variations normally amount to fifteen, thirty, fifty and one hundred pounds per square inch in various industrial applications, also in missiles, aircraft and other applications where measurement of pressure differentials is desired in indicating or controlling operation of mechanism in the device. This may be propulsion mechanism, steering mechanism, etc., where use of two fluids are employed for operating the mechanism. The present instrument is both simple and rugged in construction and can withstand pressure variations of the type which occur in commercial installations using acids and other corrosive fluids where explosions may occur without damage to the instrument by reason of the structural features desired. Since the high pressures are applied to the plates and shaft only, the sensing ring may be designed for operation at the lower pressures referred to above for obtaining a high degree of sensitivity to small pressure variations between the two fluids. A sensing ring with strain gauges operated at low pressures has been found to enable differential pressures of high pressure fluids to be more accurately measured. In missile and some commercial operations, this is highly important because extreme sensivity can be obtained with the present transducer for aiding in the control of missile propulsion and guidance systems to keep the missile more accurately on its intended or precalculated course and also control commercial processes without failure.

Figure 12:
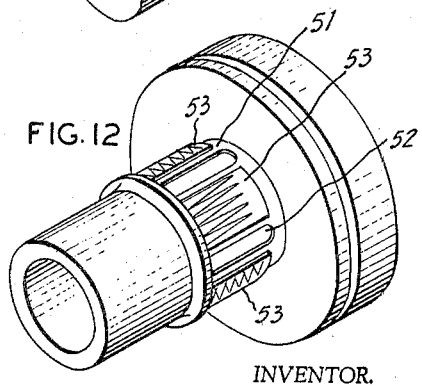
FIG. 12 shows a perspective of the force responsive member shown in FIG. 7.

A modified form of the invention is shown in FIGS. 5 to 7 inclusive, and FIG. 12 in which the housing is formed of an outer cylindrical section 40 having an inner body section 41 formed to provide a compartment 42 opening through one end of body section 41. The other end of the body section has an end wall 43 at the opposite end formed with a recess 44 surrounded by an annular rib 45. Recess 44 opens outwardly through the end of inner body section 41 at one end of the housing and outer cylindrical section 40, as clearly shown in FIG. 5. The outer end of annular rib 45 projects beyond the adjacent end of cylindrical section 40. Inner body section 41 has a press fit in outer cylindrical section 40 and has a sealed joint between sections 40 and 41 in the form of an O-ring 46 mounted in an annular groove formed in the outer portion of inner body section 41, as shown in FIG. 5. The opposite end of inner body section 41 terminates in inwardly spaced relation from the adjacent end of outer cylindrical section 40.

An end wall body section 47 has a flat inner marginal surface engaged with the flat surface on the end of inner body section 41 when it is pressed into assembled relation in outer cylindrical section 40, as shown in FIG. 5. An O-ring 48 mounted in an annular groove in the outer portion of end wall body section 47 seals the wall between outer cylindrical section 40 and the adjacent wall of end wall body section 47. End wall body section 47 has a recess 49 formed in the outer end thereof and an annular rib 50 surrounding the recess constructed so that the outer end of rib 50 extends beyond the adjacent end of outer cylindrical section 40 to substantially the same extent that inner body section 41 extends beyond the opposite end of outer cylindrical section 40 so as to provide a substantially symmetrical construction for the body of the instrument in assembled relation.

End wall body section 47 provides a support for carrying force responsive member 51 formed integral therewith, as shown in FIG. 5. This force responsive member 51 is in the form of a cylindrical structure having a plurality of longitudinally extending slots 52 to divide the cylindrical member into four sections of partially cylindrical shape, as shown in FIGS. 5, 6, 7, and 12. The unequal arrangement of the sections of force responsive member 51, as shown particularly in FIG. 6, provides for the use of a plurality of strain gauges 53 which may be of the same size or may vary in size according to the manner in which it is desired to have the instrument operate. In some instances the strain gauges will be applied so that the resistance wires of the strain gauge on a pair of opposite sections will extend longitudinally of the force responsive member while intermediate gauges will have the resistance wiring extending transversely, as indicated diagrammatically in FIG. 12. In this way, the force responsive member will be subject to having the stresses applied thereto measured in the most desirable manner either by having the strain gauges arranged in longitudinal relation, or partly in longitudinal relation and partly in transverse relation, in order to obtain the desired character of accurate recording or registering of the forces applied to the force responsive member. The strain gauges are connected to suitable registering or recording mechanism in a manner well known in the art and not illustrated in this application.

Force responsive member 51 has a head portion 54 carried on the free end thereof and provides an inwardly extending shoulder 55 at the inner end where force responsive member 51 may be integral with head portion 54. Force responsive member 51 also has an annular radially extending flange 56 projecting outwardly from the outer surface about member 51 at the lower end of slots 52 as shown in FIGS. 5 and 7. In manufacturing the force responsive member as shown in FIG. 5 in which end wall body section 47 and the force responsive member and head portion are all machined from a single piece of stock, it has been found that the length of force responsive member 51 can be very accurately determined to obtain a desired length of force responsive member for producing results of the desired character. The free end of head portion 54 extends through a central passage in end wall 43 so that the outer end projects into recess 44.

The housing has outer cylindrical section 40 and inner body section 41 formed with aligned passages 57 so that electrical wiring connected to the strain gauges extends outwardly through the housing into housing extension 58 mounted on the outer surface of outer cylindrical section 40 to provide a hermetically sealed terminal support for the electrical wiring in order to transmit electrical energy through the terminal support to the desired type of instrument and at the same time maintain the interior of the housing and compartment 42 hermetically sealed. Any suitable terminal connections for establishing electrical connection with the strain gauges and for maintaining the hermetic seal of the housing may be used and constructed in a manner well known in the art.

A force transmitting shaft 60 is mounted in coaxial relation within force responsive member 51 as shown in FIG. 5. The lower end is reduced in size to provide an annular shoulder 61 for complementary engagement with inwardly extending shoulder 55 formed by head portion 54. The reduced portion of force transmitting shaft 60 has a sliding frictionally engaging fit within cylindrical head portion 54 as shown in FIG. 5, with the outer or lower end as shown extending through the lower end of head portion 54, to the inner portion of recess 44. The upper end of force transmitting shaft 60 projects through an opening in recess 49 of end wall body section 47. Force transmitting members or plates 62 have inner flat faces engaged with the flat end face on force transmitting shaft 60 at the upper end as shown in FIG. 5 and with the lower end of head portion 54 and shaft 60 as shown at the bottom portion of FIG. 5. These force transmitting plates or members are secured by attaching pins 63 to the ends of force transmitting shaft 60 so that the force transmitting shaft, plates 62 and head portion 54 are rigidly attached together in such a manner that the marginal inner faces of force transmitting members 62 have a small space in the order of about five thousandths of an inch from the adjacent end wall surfaces of end wall 43 and end wall body section 47 respectively, to limit the movement of the force transmitting members relative to the housing for protecting force responsive member 51 against damage from excessive pressure.

Flexible barriers 64 are mounted on opposite ends of the body sections forming the housing as shown in FIG. 5 with the central portions engaged with the outer faces of force transmitting plates 62 and with the outer marginal portions engaging over the outer end faces of annular ribs 45 and 50 respectively, for attachment thereto in sealed relation for hermetically sealing the recesses in opposite ends of the housing and the force responsive and force transmitting members within the housing. These flexible barriers are firmly clamped in position by means of end caps 65 suitably bolted to outer cylindrical section 40, as shown in FIG. 5. When end caps 65 are bolted on outer cylindrical section 40, the entire instrument is held in assembled relation for operation to measure differential pressures applied against the barriers through a passage 66 formed in each end cap for connection of suitable pipes in transmitting fluids thereto for pressure measurement. The inner face of each end cap 65 is formed with a shallow chamber 67 with the inner surface of the end cap placed only a slight distance from the adjacent outer surface of flexible barrier 64 so that only a small volume or quantity of the fluid whose pressure is to be measured is admitted into the end cap. In this way slight variations in pressure of the fluids are immediately transmitted to the flexible barriers and to the force transmitting plates and shaft to operate the force responsive member and the strain gauges to immediately indicate variations in force and/or pressure differentials.

Figure 8:
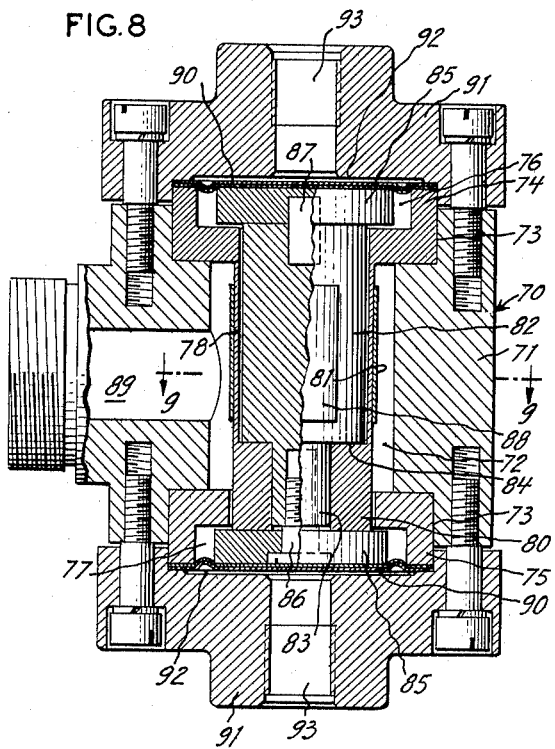
FIG. 8 is a vertical transverse cross-section with portions shown in elevation of another modified form of construction of the differential pressure transducer incorporating the features of the invention.
Figure 10:
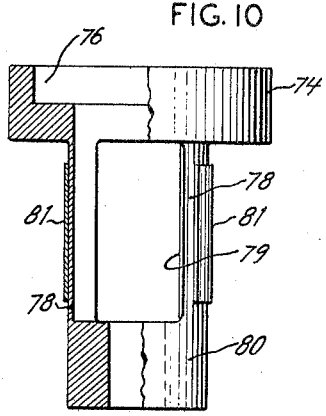
FIG. 10 is a side elevation of one of the body sections of the instrument shown in FIG. 8 carrying the force responsive member with portions broken away and shown in cross-section for convenience in illustrating details in construction.
Figure 9:
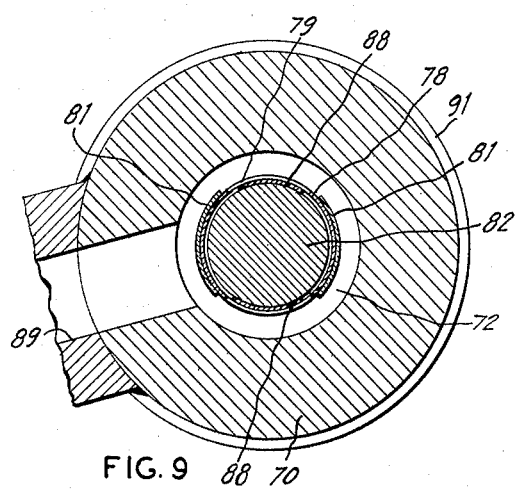
FIG. 9 is a horizontal cross-section taken on line 9—9 of FIG. 8.
Figure 11:
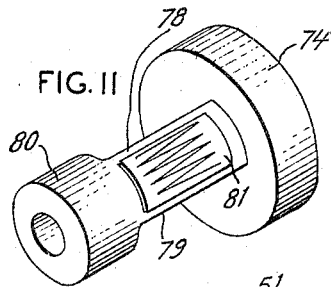
FIG. 11 shows the force responsive member and the body section illustrated in FIG. 10 in perspective looking at the force responsive member from a position substantially at right angles to FIG. 10 and from a point below the lower end of the member as shown in FIG. 10.

Another form of the invention is illustrated in the drawings in FIGS. 8 to 11 inclusive in which the housing 70 is formed of a cylindrical body section 71 formed with a central compartment 72 and recesses 73 in the outer ends of a size larger than compartment 72 which open outwardly through the ends of body section 71. End body sections 74 and 75 are formed to have the inner ends frictionally fit in tight relation in body section 71 within recesses 73 so that the inner ends engage the end of body section 71 at the bottom of the recesses 73. The outer end of each of end body sections 74 and 75 projects beyond the outer end of body section 71 as shown in FIG. 8. The outer ends of each of end body sections 74 and 75 are formed with recesses 76 and 77 respectively, opening outwardly through the end of the end body sections. End body sections 74 and 75 are each formed with aligned passages of smaller size than recesses 76 and 77, as shown in FIG. 5, so that the recesses 76 and 77 communicate through the passages with compartment 72.

End body section 74 has a cylindrical force responsive member 78 extending from the inner face in concentric relation within body section 71. Cylindrical force responsive member 78 has a pair of oppositely located apertures 79 formed therein extending between the inner face of end body section 74 and head member 80 carried on the opposite end of force responsive member 78 from that attached to end body section 74. The partially cylindrical portions of force responsive member 78 are arranged in diametrically opposite relation to one another and carry strain gauges 81 connected for operating suitable registering or recording equipment of a well known character not shown. The outer end of head portion 80 extends through the passage in end body section 75 as shown in FIG. 8 so that the end surface will lie within recess 77.

A force transmitting shaft 82 is mounted in concentric and axial relation within force responsive member 78, as shown in FIG. 8, with one end shown at the upper portion of FIG. 8 extending into recess 76 through the passage in end body section 74. The lower end has a reduced extension 83 formed thereon to provide a shoulder 84 which seats against the inwardly extending shoulder portion formed by the inner end of head portion 82. The outer or lower end of head portion 80 extends through the passage in end body section 75 into recess 77. Extension 83 on force transmitting shaft 82 extends through a central opening in head portion 80 with a frictional fit with the head portion so that the lower end will terminate adjacent the outer end of the head portion. A pair of force transmitting members or plates 85 are mounted in recesses 76 and 77, respectively, with the inner flat faces engaged with the outer faces on the ends of force transmitting shaft 82 and head portion 80, as clearly shown in FIG. 8. An attaching screw 86 is used to attach force transmitting member 85 in recess 77 to the end of force transmitting shaft 82 and the end of head portion 80 and for securing shoulder 84 in firm engagement with the inner end of head portion 80. Force transmitting member 85 mounted in recess 76 is attached to the opposite end of force transmitting shaft 82 by means of a pin 87 having a force friction fit for firmly attaching the force transmitting member to the force transmitting shaft.

With the construction shown in FIGS. 8 to 11, an arrangement is provided in which a pair of strain gauges 88 may be applied to opposite sides of force transmitting shaft 82 through aperture 79 in force transmitting member 78. This provides for a combined compression and tension force responsive arrangement for operating the registering or recording apparatus connected with the strain gauges in recording the differential pressures applied to plates 85 in opposed relation at opposite ends of the housing. Body section 71 has a passage 89 formed at one side and extending through a projection on the side of the housing for accommodating the wires connecting the strain gauges to the recording or registering instruments. A suitable arrangement can be made on the side of the housing, as described above in connection with FIG. 5, for providing a hermetic seal about the wires in order that the compartment within the housing can be hermetically sealed.

Flexible barriers 90 are mounted on opposite ends of the casing and have the central portions engage the outer faces of force transmitting members or plates 85 with the outer marginal portions hermetically sealed on the outer faces of end body sections 74 and 75, as shown in FIG. 8. End caps 91 are provided with shallow chambers 92 on the inner faces thereof surrounding the passages 93 so that fluid connections for the passage of fluid under pressure through passages 93 can move through the end caps into chambers 92 and be applied to the outer surfaces of flexible barriers 90 for operating the instrument to transmit pressure variations at opposite ends of force transmitting shaft 82 to strain gauges and force transmitting member 78 for measuring differential pressure variations. The end caps are bolted on housing 70, as shown in FIG. 8, so that when the instrument is in assembled relation the force responsive members and strain gauges within the housing are hermetically sealed to obtain an improved operation of the instrument without likelihood of damage from corrosive fluids or other mediums.

It will be understood from the above description and the disclosures in the several figures of the drawing that the force transmitting shaft may be attached to the force responsive member carrying the strain gauges either by means of a pin or by means of interengaged shoulders on the force responsive member and force transmitting shaft. In each case the arrangement of the pin or shoulders can be varied with regard to the end of the force responsive member opposite to that attached to the housing section so as to position the point of attachment relative to the force responsive member to place the members in relation to each other so there will be no zero shift in the instrument within the range of measurements for which the instrument mounted on opposite ends thereof in order to obtain a direct application of the forces to the instrument in opposed relation for measurement of differential pressures. This provides a simple and inexpensive instrument construction for obtaining highly accurate results in the measurement of pressure differentials.

By constructing the housing of a plurality of interfitting body sections as shown in the several figures of the drawing and in the different forms of construction, it will be understood that an arrangement is provided in which the parts can be accurately machined to interfit with one another and manufactured at a low cost because of the simple construction and simple method of assembly of the several housing parts in which the bolts securing the end caps retain the housing parts, for the most part, in rigid assembled relation for setting the parts in adjusted position upon assembly and retaining them in this position throughout the use of the instrument in hermetically sealed relation. The force transmitting members or plates and the force transmitting shaft may be made in any suitable manner for supporting the marginal portions of the inner faces of the members or plates at a slight distance from the adjacent wall of the body sections to limit movement and prevent damage to the force responsive member when excessive pressures are applied. The constructions illustrated provide a construction that is economical to manufacture, assemble and service.

The compartment inside the housing is evacuated after the barriers are sealed on the ends of the housing. This enables removal of moisture from the housing for eliminating the likelihood of corrosion inside the housing.

As soon as the parts for each transducer are completed, it is desirable to assemble them into complete assembled form. The wiring for the strain gauges is then connected to a set of instruments of the type usually used with the transducer. Suitable pipe connections are made to the caps on the ends of the housing so the transducer may have fluid or other pressures for which it is designed applied to opposite ends of the plates through the barriers. A suitable type of test installation not shown or described may be set up for testing operation of the transducers constructed as hereinbefore described. In some instances the transducer will cause the instrument connected thereto to shift out of the zero position. It is then necessary to disassemble the entire apparatus and the transducer. The shoulders are then machined to change their location or the pin 27 is removed and replaced in a new location. The transducer is then reassembled and tested. The transducer has the parts continuously changed until the zero shift is eliminated. This may even require replacement of some of the parts. When the changes eliminate zero shift on the test instruments the transducer is then ready for use in measuring differences in pressure.

The invention claimed is:

1. A differential pressure transducer comprising a housing having separable body sections, each body section having a recess formed therein opening through the outer end, a rib portion formed on the outer end of each body section surrounding said recess, each body section having the inner end portion formed with a compartment opening through the inner end, the compartments in each body section communicating with each other and said recesses in assembled relation of said body sections to form a single compartment within said housing extending between the outer ends of said housing, a seat portion formed on the inner portion of one of said body sections, a force responsive member having a base portion mounted on said seat portion and a head member movably engaged in a passage formed in the other of said body sections extending between said compartment and recess therein, said body sections and said base portion and head member of the force responsive member each having aligned passages formed therein, a force transmitting shaft extending through said aligned passages and having opposite extremities located in the recesses in the ends of said body sections, a pair of circular force transmitting plates having parallel opposite faces each mounted in one of said recesses in the outer end of said body sections, means rigidly attaching the central portion of said plates to opposite ends of said shaft, with the inner surfaces spaced a slight distance from the adjacent portions of said body sections at the inner ends of said recesses, means attaching said shaft to the head member of said force responsive member for transmitting forces applied to said shaft by said plates to the force responsive member, a pair of flexible diaphragms each applied over the outer face of one of said plates and the adjacent rib portion for sealing the open ends of said recesses, a pair of cap members each applied to one end of said housing, each cap member having a clamping portion engaging the marginal portion of a diaphragm in opposed relation to the end of said rib portion and having a passage for fluid to engage said diaphragm on the outer side for applying pressure to said plates at opposite ends of said housing, means detachably connecting said cap members to said housing, and means sensitive to force variations applied to said force responsive member for registering pressure differentials in fluids applied to opposite ends of said shaft.

2. A differential pressure transducer, comprising a housing formed with a compartment, recesses in opposite ends opening outwardly and aligned passages in opposite ends connecting the recesses with the central portion of the compartment, seat portions formed on opposite ends of said housing about said recesses, plate members movably mounted one in each of said recesses, a solid cylindrical force responsive shaft having opposite terminals connected to said plate members with intermediate portions extending through said compartment and aligned passages in said housing, a force responsive member mounted in said compartment in said housing having one end attached to said housing and the opposite end attached to said shaft, a pair of diaphragms one covering each plate member and recess and having the marginal portion engaged on one of said seat portions, a pair of cap members one mounted on each end of said housing and having a shoulder portion clamping the marginal portion of each diaphragm on the adjacent seat portion on said housing, said cap members having passages in the outer ends for applying fluid pressure to the outer faces of said diaphragms for operating said plate members to transmit pressures in said cap members to said plate members, shaft and force responsive member, and means operated by said force responsive member for registering the pressure differential of fluids applied to opposite ends of said shaft, plates and force responsive member.

3. A differential pressure transducer comprising a housing having end walls formed with outwardly opening recesses, a compartment formed in said housing between said end walls, said end walls having aligned passages formed therein in the central portion of said end walls having a smaller size than said recesses and compartment, a force responsive member having a base portion mounted on the inner side of one end wall, having a passage formed therein aligned with the passage in said one end wall and a head member slidably engaged in the passage in the other end wall and having a passage formed therein aligned with the passage in the base member thereof and said one end wall, a solid cylindrical force transmitting shaft extending in axial relation through the aligned passages in the head and base portions of said force responsive member and said end walls, said shaft having the ends terminating in the recesses in said end walls, plate members having flat outer faces mounted one in each recess and having the central inner faces of each engaged with one extremity of said shaft and the outer marginal portion of said inner faces arranged in opposed spaced relation to the adjacent end wall of said housing at the bottom of said recess, said plate members having said flat outer faces arranged in substantially coplanar relation to the outer faces of said end walls adjacent said recesses, a pair of diaphragms each mounted on one end wall and engaging the flat face of one of said plate members for sealing the ends of said recesses and a pair of cap members detachably mounted each on one end of said housing, said cap members having a portion engaging and clamping the marginal portions of said diaphragms in sealed relation against said end walls about said recesses, and said cap members being formed with passages communicating with the outer faces of said diaphragms for having separate fluids contact each diaphragm for applying pressures to the plate members, shaft and force responsive member for measurement of the pressure differential.

4. A differential pressure transducer comprising a housing formed of a pair of separable sections, each section having a wall portion engaging one another in abutting relation to fix the distance between the end walls of said housing in assembled relation of said sections, said housing having the end walls formed with recesses opening outwardly and cylindrical walls defining said recesses and having flat end wall portions at the bottom of said recesses in parallel relation, a passage formed in said end walls in longitudinally extending relation having a smaller size than said recesses and opening into the center portion of said recesses, said housing having a compartment extending between said end walls into which said passages open, one of said sections having a cylindrical seat portion formed in the inner side of the end wall about said passage, a force responsive member having a cylindrical base member detachably and rigidly secured to said seat portion of said housing and formed with a central bore registering with the passage in the end wall adjacent thereto in coaxial relation, said force responsive member having a head portion formed on the opposite end to said base portion extending through the passage in the other of said sections and formed with a central bore aligned with the bore in said base member and the passage in said one of said sections, said head portion having the free end terminating in the recesses in said other of said sections and having a plurality of strip sections of arcuate cross section and substantially uniform thickness connecting said head and base portions, a shaft of predetermined size having one end slidably engaged in said central bore in said head portion and the opposite end extending through the central bore in said base portion and the passage in said one of said sections in coaxial relation, said shaft having the extremities located in the bottom portions of said recesses, an attaching member extending transversely through said head portion and the portion of the shaft engaged therein rigidly securing said shaft and head portion together, a pair of plates each located in one of said recesses having opposite parallel faces, the inner faces having the central portion engaged and secured to the extremities of said shaft and having the marginal portions spaced approximately five thousandths of an inch from said flat end wall portions in opposed relation for limiting longitudinal movement of said shaft relative to said housing in both directions, flexible diaphragms mounted on opposite ends of said housing, extending over the open ends of said recesses and engaged with and supported by the outer faces of said plates, cap members detachably mounted on opposite ends of said housing for retaining said diaphragms in sealed relation on the housing and having conduits for conducting fluid under pressure into engagement with the outer sides of the diaphragms for applying pressure to said plates and shaft, and strain gauge means mounted on said curved strip sections for registering the pressure differential of the fluids applied to opposite ends of said shaft, plates and force responsive member.

5. A differential pressure transducer comprising a housing having separable body sections, selected body sections having a recess in the outer end, a rib portion formed on the outer end of each selected body section surrounding said recess, said body sections being formed to provide a compartment therein in assembled relation extending between the outer ends of said housing, a force responsive member having a base portion attached to a selected body section and a head member movably engaged in a passage formed in another selected body section extending between the recess therein and said compartment, said body sections and said base portion and head member of the force responsive member each having aligned passages formed therein, a solid cylindrical force transmitting shaft extending through said aligned passages and having opposite extremeties extending substantially to the recesses in the ends of said body sections, a pair of force transmitting plates each mounted in one of said recesses in the outer ends of said selected body sections, means attaching said plates to opposite ends of said shaft with the inner surfaces spaced a slight distance from the adjacent portions of said selected body sections at the inner ends of said recesses, means attaching said shaft to the head portion of said force responsive member for transmitting forces applied to said shaft by said plates to the force responsive member, a pair of flexible diaphragms each applied over the outer face of one of said plates and the adjacent rib portion for sealing the open ends of said recesses, a pair of cap members each applied to one end of said housing, each cap member having a clamping portion engaging the marginal portion of a diaphragm in opposed relation to the end of said rib portion and having a passage for fluid to engage said diaphragm on the outer side for applying pressure to said plates at opposite ends of said housing, means detachably connecting said cap members to said housing, and means sensitive to force variations applied to said force responsive member for registering pressure differentials in fluids applied to opposite ends of said shaft.

6. A differential pressure transducer as claimed in claim 5, wherein said housing comprises selected body sections at opposite ends, each having a recess therein opening outwardly at the outer end in an opposite direction to the recess at the other end, and having the inner ends engaged with other body sections cooperating to form a compartment in the housing.

7. A differential pressure transducer as claimed in claim 5, wherein said force responsive member is formed of a pair of opposite partially cylindrical arcuate sections arranged in cylindrical relation and extending in coaxial relation to said force transmitting shaft between said base portion and head member, said head member having the inner end thereof forming a transverse shoulder engaging a shoulder formed on said force transmitting shaft for cooperation in transmitting force to said partially cylindrical arcuate sections, said means sensitive to force variations having sensing portions attached to said partially cylindrical arcuate sections.

8. A differential pressure transducer as claimed in claim 5, having the force responsive member formed of a cylindrical element extending in perpendicular relation to the force transmitting plates and in coaxial relation about the force transmitting shaft between the base portion and head member, said cylindrical element having longitudinal extending slots formed therein extending between said base portion and head member, to form a plurality of partially cylindrical strip sections said head member having the outer end forming a seat engaging and supporting the adjacent force transmitting plate and the inner end formed with an inwardly extending shoulder engaging a shoulder on the force transmitting shaft, and means securing said adjacent force transmitting plate to said force transmitting shaft for retaining said shaft, plate and head member in rigid assembled relation for transmitting force to said cylindrical element.

9. A differential pressure transducer as claimed in claim 5, having the force responsive member formed of a cylindrical element extending in perpendicular relation to the force transmitting plates and having a plurality of longitudinally extending slots between the base portion and head member to form a plurality of partially cylindrical strip portions, and the means sensitive to force variations having a strain gauge mounted on each strip portion of said cylindrical element between said slots and opposite ends thereof, at least some of said strain gauges having resistance elements extending in longitudinal relation.

10. A differential pressure transducer as claimed in claim 5, having the force responsive member formed of a plurality of spaced longitudinally extending partially cylindrical and arcuate strips arranged in cylindrical relation between the base portion and head member, and the means sensitive to force variations having a plurality of strain gauges each mounted on one of said strips between the ends thereof, selected strain gauges having resistance elements therein extending longitudinally of said strips and the other strain gauges having resistance elements therein extending transversely of said strips.

11. A differential pressure transducer as claimed in claim 5, having one of the selected body sections formed with a recess in the outer end and a passage extending through the central portion thereof smaller than said recess, and also formed with an integral tubular extension projecting in axial relation from the side opposite the recess and formed at the opposite end with a head member having a central passage aligned with the passage in said body section, said head member being formed to provide a shoulder at the end and on the inner side of said tubular extension, whereby said extension forms the force responsive member for mounting portions of the means sensitive to force variations.

References Cited by the Examiner

UNITED STATES PATENTS

| 2,627,749 | 2/1953 | Li | 73—398 |
|---|---|---|---|
| 2,680,376 | 6/1954 | Shaw et al. | 73—88.5 |
| 2,951,223 | 8/1959 | Yao Tzu Li | 73—88.5 |
| 2,981,912 | 4/1961 | Di Giovanni | 73—398 |
| 3,022,672 | 2/1962 | Dimeff et al. | 73—398 |
| 3,057,202 | 10/1962 | Duman | 73—398 |

FOREIGN PATENTS 1,030,597  6/1953  France.

RICHARD C. QUEISSER, *Primary Examiner.*

DAVID SCHONBERG, *Examiner.*